United States Patent [19]
White

[11] 3,764,193
[45] Oct. 9, 1973

[54] LENS SUPPORTING STRUCTURE FOR A DUAL POWER MICROSCOPE

[75] Inventor: Donald D. White, Rochester, N.Y.

[73] Assignee: Bausch & Loub Incorporated, Rochester, N.Y.

[22] Filed: Jan. 14, 1972

[21] Appl. No.: 217,812

[52] U.S. Cl. .................. 350/37, 350/46, 350/255
[51] Int. Cl. ............................................ G02b 7/04
[58] Field of Search ................. 350/37, 40–44, 350/46, 47, 67, 78, 79, 255, 187

[56] References Cited
UNITED STATES PATENTS

| | | | |
|---|---|---|---|
| 3,510,202 | 5/1970 | Boughton | 350/44 X |
| 3,472,564 | 10/1969 | Kellner | 350/255 X |
| 3,058,391 | 10/1962 | Leupold | 350/67 X |
| 737,872 | 9/1903 | Saegmuller | 350/44 X |

Primary Examiner—David H. Rubin
Attorney—Frank C. Parker et al.

[57] ABSTRACT

Lens supporting structure for a dual power microscope including a support pillar, a relay carrier and a slide. The support pillar includes a recess in which the relay carrier, of tubular configuration, is received. Within the relay carrier is a relay lens mounting cell. The slide, also of tubular configuration, is designed to support an eyepiece lens system at one of its ends, an objective lens system at its opposite end and is provided with a longitudinal slot intermediate its ends. When the tubular slide is assembled within the relay carrier the relay lens mounting cell is received within the longitudinal slot. With this arrangement, the opposite ends of the slot cooperate with the relay lens mounting cell to define the limits of relative movement between the tubular slide and the relay carrier. O-rings are provided between the tubular slide and the relay carrier and also between the relay carrier and the recess which receives the relay carrier to center the tubes with respect to each other and with respect to the recess which receives the relay carrier. Apparatus is also provided to permit relative movement between the relay carrier and the support pillar.

5 Claims, 3 Drawing Figures

LENS SUPPORTING STRUCTURE FOR A DUAL POWER MICROSCOPE

CROSS-REFERENCES TO RELATED APPLICATIONS

The present invention is related to the invention described in concurrently filed and commonly assigned application Ser. No. 217,811 of Harold E. Rosenberger for Dual Power Microscope.

BACKGROUND OF THE INVENTION

1. Field of the Invention

The field of the invention is microscopes incorporating variable magnification optical systems, and more specifically dual power optical systems having a finite object conjugate.

2. Description of the Prior Art

Inexpensive microscopes for children in elementary schools have been mostly limited to fixed power instruments, which restrict the extent to which a child's awakening interest in the minute, natural world about him can be stimulated. While there have been some dual power instruments which afford both low and high power views, they have suffered in the main from either high costs if their image quality was good, or poor image quality if their costs approached what school administrations can afford.

Axially movable intermediate lenses between fixed objective and eyepiece lenses are known in the telescope art where the object conjugate is infinite. See, for example U.S. Pat. No. 2,479,792 to R.B. Tackaberry. In microscopes, where the object conjugate is not only finite, but usually quite short, at least two moving intermediate lenses, each following a different path, have been used. Since the actuating mechanisms for such complex movements are quite costly there is little prospect for their being used in inexpensive microscopes.

SUMMARY OF THE INVENTION

A microscope including support structure, a relay carrier and a slide. The support structure includes a recess for receiving the relay carrier. The relay carrier, which takes the general form of a hollow tubular member, includes a relay lens mounting cell. The slide also takes the general form of a hollow tubular member. This slide is designed to support both an eyepiece lens system and an objective lens system and is provided with an intermediately located aperture. When the slide is assembled within the relay carrier the relay lens mounting cell is received within the aperture. Additionally, O-rings are supported between the slide and the relay carrier and between the relay carrier and the support structure for centering both tubes with respect to each other and with respect to the recess which receives the relay carrier. Apparatus is also provided for permitting relative movement between the relay carrier and the support structure.

DETAILED DESCRIPTION OF THE INVENTION

Figure 1:
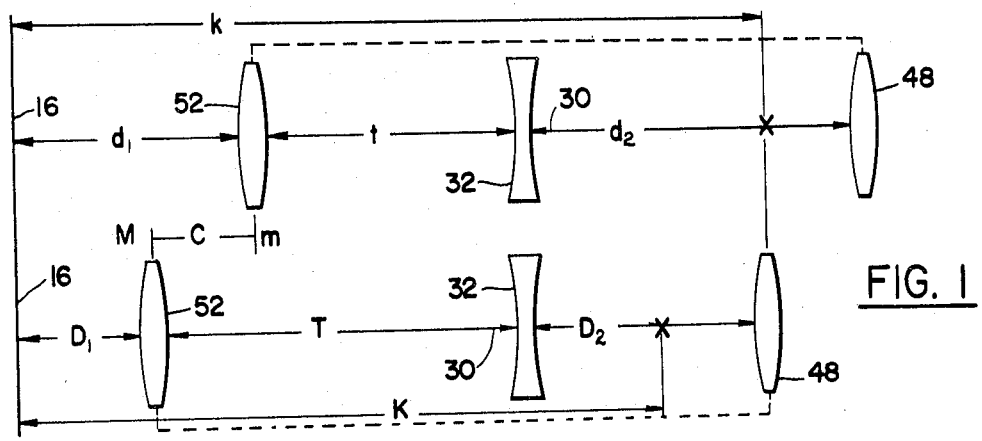
FIG. 1 is an optical schematic diagram of the microscope at low and high power settings, showing the relationships between them.

A. Optical design:

The upper part of FIG. 1 schematically illustrates the low power position of microscope optics which would be accommodated by my device. An eyepiece 48 and an objective 52 are held at a fixed conjugate shown by the dotted line. A relay lens 32 is held at a fixed conjugate from the specimen plane 16. A low magnification $m$ is realized at this position wherein $d_1$ is the object distance, $t$ is the distance separating the objective lens 52 and the relay 32, while $d_2$ separates the relay from the eyepiece focal plane $x$.

The lower portion of FIG. 1 illustrates the high power position which must also be accommodated. $D_1$ is the object distance, $T$ the separation of objective and relay, and $D_2$ the separation of the relay from the eyepiece focal plane $x$. The high power M is realized, therefore, when the objective and eyepiece have moved as a unit, as indicated by the dashed line, through a linear distance C from the small case $m$ (upper) position to the large case M (lower) position. Since the relay-to-stage conjugate remains fixed, it will be appreciated that $$d_1 + t = D_1 + T.$$

Figure 2:
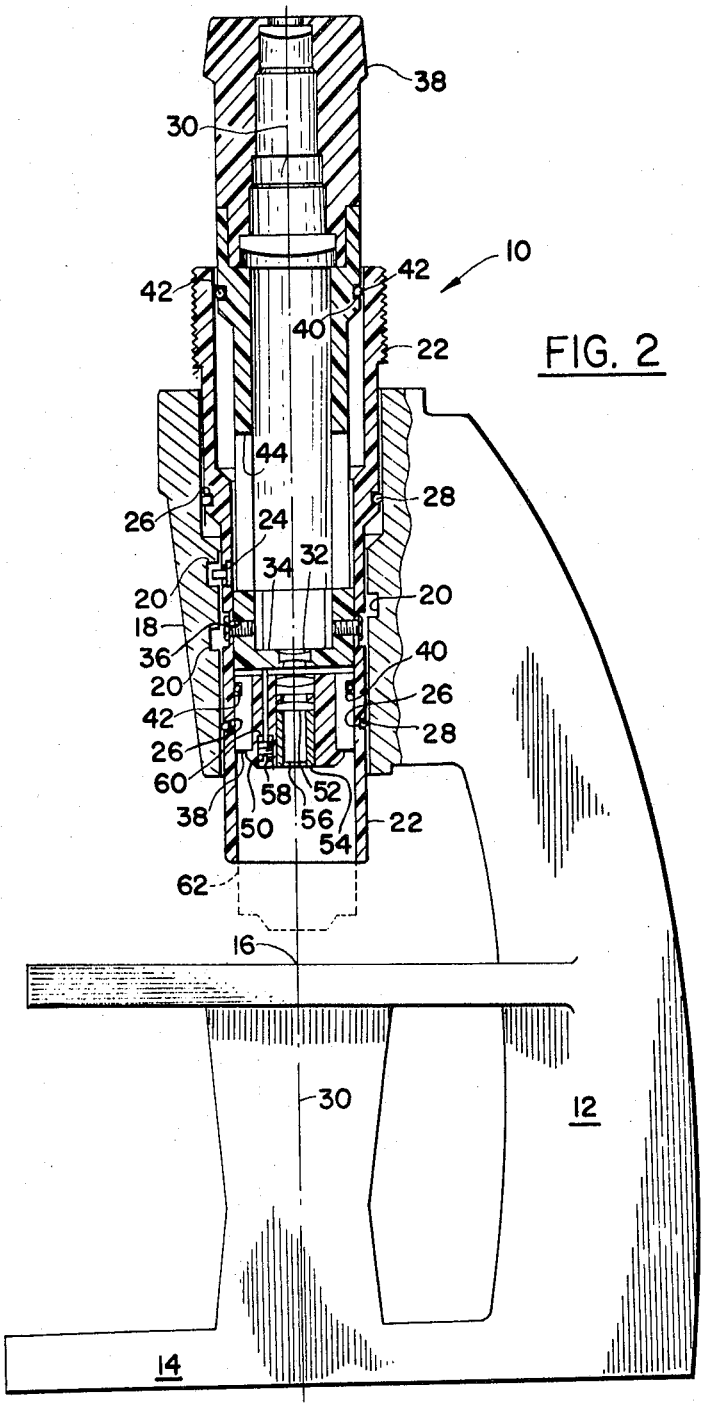
FIG. 2 is a sectional profile of my microscope.

B. Mechanical design:

In FIG. 2, the microscope is designated generally as 10. A support pillar 12 rises from a base 14 and carries a specimen stage 16 as well as a microscope receiving tube 18. The interior of the tube 18 is formed to define a helical groove 20. A relay carrier 22, of tubular shape, is receivable in the tube 18. The carrier 22 is molded around a pin 24 which is cooperative with the groove 20 to advance the carrier 22 along the axis of the tube 18 when the carrier is rotated relative to the tube. The exterior of the carrier 22 defines a plurality of circumferential grooves 26 in which O-rings 28 are fitted. The O-rings 28 are slightly oversized relative to the outline of the grooves 26 and are preferably of a pliant, resiliently deformable material (such as silicone rubber) chosen for a sliding compatibility with the interior walls of the receiving tube 18. The O-rings 28 serve to hold the carrier 22 centered on the microscope's optical axis 30 and also are the bearings which permit the carrier 22 to be rotated by means of the pin 24 and the helical groove 20.

A relay lens 32 is pressed into a cooperative aperture formed in a relay lens mounting cell 34 and the latter is fastened by means of the eyelets 36 to the carrier 22.

Meanwhile a tubular slide 38 provided with circumferential grooves 40 in which are fitted O-rings 42, is coaxially received in the smooth-walled interior bore in the relay carrier 22, the O-rings 42 being of a pliant, resiliently deformable material and serving to center the slide 38 to the optical axis 30 and to provide a slide bearing surface for the slide 38 to move axially within the relay carrier 22.

Figure 3:
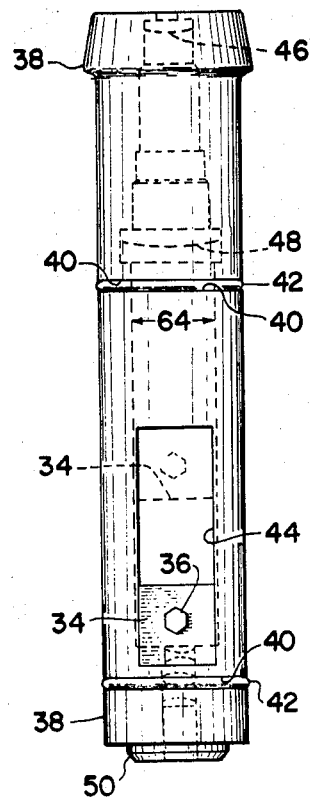
FIG. 3 is a side view of a part of the microscope, showing the means for relative sliding of the two main assemblies.

Viewed from the side, as in FIG. 3, the slide 38 is provided with a rectangular aperture 44 of a width cooperatively corresponding with the vertical sides of the relay lens cell 34.

The slide 38 serves as a mount for the eyepiece lenses 46, 48, and for the objective lens cell 50. The objective lenses 52 are retained in a central bore of the cell 50, coaxial with the optical axis 30 of the microscope, by a member 54 which additionally serves to define an aperture stop 56. A stop screw 58 is threaded into a second bore 60 located eccentrically in the cell 50.

During assembly the relay lens cell 34 is first loosely placed in the aperture 44 of the slide 38, which is then placed within the interior bore of the carrier 22 and the relay cell 34 is then rigidly affixed by means of the eyelets 36 to the carrier 22. Thus, the slide 38 is constrained within the carrier 22 for sliding motion through an excursion, which is defined at the upper end by the top of the relay lens cell 34 interfering with the top of the aperture 44, and at the bottom by the adjustable stop screw 58 bumping the bottom of the relay lens cell 34. The microscope assembly is completed by insertion of the relay carrier 22 into the microscope receiving tube 18, the pin 24 being guided into the helical grooves 20.

Thus, when fully assembled the slide 38 serves to hold the objective lens 52 in fixed spatial relationship to the eyepiece lenses 46, 48, while the support pillar 12 serves to hold the relay lens 32 in fixed spatial relationship to the specimen stage 16. It will be appreciated, however, that the carrier 22 may be rotated and moved along the axis 30 for focusing of the microscope, but that once focused the conjugate from the relay lens 32 to the stage 16 remains fixed during the actual use of the microscope.

As shown in FIG. 2, with the tip of the stop screw 58 engaged with the bottom of the relay lens cell 34, the microscope is in the low power position. When the objective lens and eyepiece lenses incorporated in the slide 38 are moved downward as a unit, by pushing the slide 38 downward until the objective lens cell occupies the position shown in dotted outline 62, the microscope is brought to the high power position.

In practice the high power position is realized by depressing the slide 38 until the top of the aperture 44 is engaged with the top of the relay lens cell 34. The carrier 22 is then rotated to bring a specimen slide of standard thickness on the stage 16 into focus, it being recalled that at high power the focal envelope is relatively narrow. The slide 38 is then raised until the image is observed to be in focus at the low power position, the low power focal envelope being significantly wider than at the high power setting. The stop screw 58 is then adjusted to meet the relay lens when a condition of sharpest focus is observed. The range of travel of the slide 38 then corresponds to the dimension C discussed above.

I claim:

1. Apparatus for supporting the optical elements of a microscope, said apparatus comprising:
   a. support means, said support means including carrier receiving means;
   b. carrier means in the general form of a hollow tubular member at least partially disposed within said carrier receiving means, said carrier means including relay lens mounting means; and
   c. slide means in the general form of a hollow tubular member, said slide means including objective lens supporting means and eyepiece lens supporting means, said slide means further including an elongated through aperture located between said objective lens supporting means and said eyepiece lens supporting means, said slide means being at least partially disposed within said carrier means with said relay lens mounting means disposed within said aperture to thereby limit the relative motion between said slide means and said carrier means.

2. Apparatus for supporting the optical elements of a microscope, said apparatus comprising:
   a. support means, said support means including carrier receiving means;
   b. carrier means in the general form of a hollow tubular member at least partially disposed within said carrier receiving means, said carrier means having relay lens mounting means disposed therein;
   c. means supported between said carrier means and said carrier receiving means for centering said carrier means within said carrier receiving means; and
   d. slide means in the general form of a hollow tubular member, said slide means including means for supporting an objective lens means and means for supporting an eyepiece lens means, said slide means further including a through aperture located between said objective lens supporting means and said eyepiece lens supporting means, said slide means being at least partially disposed within said carrier means with said relay lens mounting means disposed within said aperture to thereby limit the relative motion between said slide means and said carrier means.

3. The apparatus according to claim 2 further including cooperative means provided on both said carrier means and said carrier receiving means for permitting relative movement between said carrier means and said support means.

4. The apparatus according to claim 2 further including means supported between said carrier means and said slide means for centering said slide means within said carrier means.

5. Apparatus for supporting the optical elements of a microscope, said apparatus comprising:
   a. support means, said support means including carrier receiving means;
   b. carrier means in the general form of a hollow tubular member at least partially disposed within said carrier receiving means, said carrier means having relay lens mounting means disposed therein;
   c. means supported between said carrier means and said carrier receiving means for centering said carrier means within said carrier receiving means;
   d. cooperative means provided on both said carrier means and said carrier receiving means for permitting relative movement between said carrier means and said support means;
   e. slide means in the general form of a hollow tubular member, said slide means including means for supporting an objective lens means and means for supporting an eyepiece lens means, said slide means further including a through aperture located between said objective lens supporting means and said eyepiece lens supporting means, said slide means being at least partially disposed within said carrier means with said relay lens mounting means disposed within said aperture to thereby limit the relative motion between said slide means and said carrier means; and
   f. means supported between said carrier means and said slide means for centering said slide means within said carrier means.

\* \* \* \* \*